United States Patent [19]

Welty et al.

[11] 4,020,673
[45] May 3, 1977

[54] FUEL ROD PRESSURIZATION

[75] Inventors: Richard K. Welty; Dan L. Robinson, both of Richland, Wash.; Harry R. Deveraux, Idaho Falls, Idaho

[73] Assignee: Exxon Nuclear Company, Inc., Bellebue, Wash.

[22] Filed: Jan. 14, 1975

[21] Appl. No.: 540,895

[52] U.S. Cl. .............................. 73/37; 73/432 R; 176/32
[51] Int. Cl.² ................. G01M 19/00; G21C 19/12
[58] Field of Search ................ 176/31, 19 R, 32; 219/121 LM; 73/37, 40.5 A, 194 A, 194 B

[56] References Cited
UNITED STATES PATENTS

| | | | |
|---|---|---|---|
| 3,296,864 | 1/1967 | Kealy et al. | 176/19 R X |
| 3,673,857 | 7/1972 | Teitelbaum | 73/40.5 A |
| 3,774,010 | 11/1973 | Heer et al. | 219/121 LM |

Primary Examiner—James J. Gill
Attorney, Agent, or Firm—F. Donald Paris; R. D. Hantman

[57] ABSTRACT

A method and system for fuel rod pressurization and for verifying when pressurization of a fuel rod containing nuclear fuel has taken place. One end of the loaded fuel rod is inserted into a pressure chamber in sealed relation thereto, whereupon the chamber is evacuated to remove the air present. Then the chamber is pressurized with an inert gas. The fuel rod then is drilled to provide an opening in the end of the fuel rod in the chamber, whereupon the rod is pressurized with the inert gas present in the chamber. Acoustic transducers are attached to the fuel rod at predetermined locations externally of the chamber for monitoring any noise which occurs during the pressurization process, which is transmitted through the metal walls of the rod to the transducers. The transducers generate electrical signals which are proportional to the amplitude of the noise sensed and by observing the signals a calibration of the activity going on can be maintained. A pressure transducer is connected with the pressure chamber for monitoring the status of the pressure in the chamber and providing an output signal which is proportional thereto. The acoustic and pressure signals are processed through appropriate electronic circuitry and recorded in analog and/or digital fashion for providing a comparative indication as to the status of when the necessary steps and activities for pressurization of the fuel rod have been accomplished.

16 Claims, 2 Drawing Figures

FUEL ROD PRESSURIZATION

BACKGROUND OF THE INVENTION

In connection with the design of certain nuclear reactors, it is desirable and sometimes required to provide fuel rods which have been internally pressurized. It is desirable to have pressurized fuel rods to between 200 and 700 psig with an inert gas, preferably helium.

Generally, the approach for pressurizing a fuel rod has been to load the fuel rod with the nuclear fuel and then to pressurize it. Obviously, however, this requires providing appropriate access to the interior of the rods after the fuel has been loaded in order to apply the necessary pressure. This has been usually accomplished by a number of methods, one of which includes providing end caps having preformed access openings therein for application of the pressure once the end caps have been secured to the fuel rod. This technique, however, has been found deficient for a variety of reasons, some of which are listed in prior art U.S. Pat. No. 3,774,010. The patent also discloses another technique for pressurizing a loaded fuel rod which includes locating an end of the rod within a pressure chamber and then by means of a laser beam, causing an access hole to be formed in the end of the fuel rod, and then proceeding with the pressurization thereof. Verification that the fuel rod has been properly pressurized heretofore has been accomplished by waiting for a sufficient amount of time to elapse to ensure that the pressure in the chamber has come to equilibrium with the fuel rod. This practice has proven to be deficient since it does not provide an accurate indication of when pressurization of the rod has been completed.

The present invention provides a system and method for determining when pressurization of the fuel rod has been completed, as well as providing a means for determining when each of the activities associated and usually preceding such pressurization have occurred and when they have been completed.

SUMMARY OF THE INVENTION

The present invention relates to nuclear fuel rods and more particularly to a system and method for verifying the pressurization of the fuel rod containing nuclear fuel. The method is non-destructive and essentially comprises acoustically monitoring the noises produced during the various steps involved in the pressurization of the fuel rod, and at the same time monitoring the status of pressure within the pressurization chamber which has an end of the loaded fuel rod located therein. By appropriately processing the electrical output signals from the acoustic and the pressure transducers, there is obtained a pair of traces for the acoustic and pressure activity occurring during pressurization of the fuel rod. A comparison of these traces will permit one to readily determine at least when pressurization has been completed.

Accordingly, it is an object of this invention to provide a system and method for determining when pressurization of a fuel rod has taken place.

Another object of the present invention is to provide a method and system for monitoring pressurization of a fuel rod by recording the outputs of the monitored characteristics for ultimate comparison so that a determination can be made as to when pre-pressurization of the fuel rod has taken place.

These and other objects of the present invention will be apparent to those skilled in the art upon reading of the following detailed description in connection with the accompanying drawings.

DESCRIPTION OF THE PREFERRED EMBODIMENT

Figure 1:
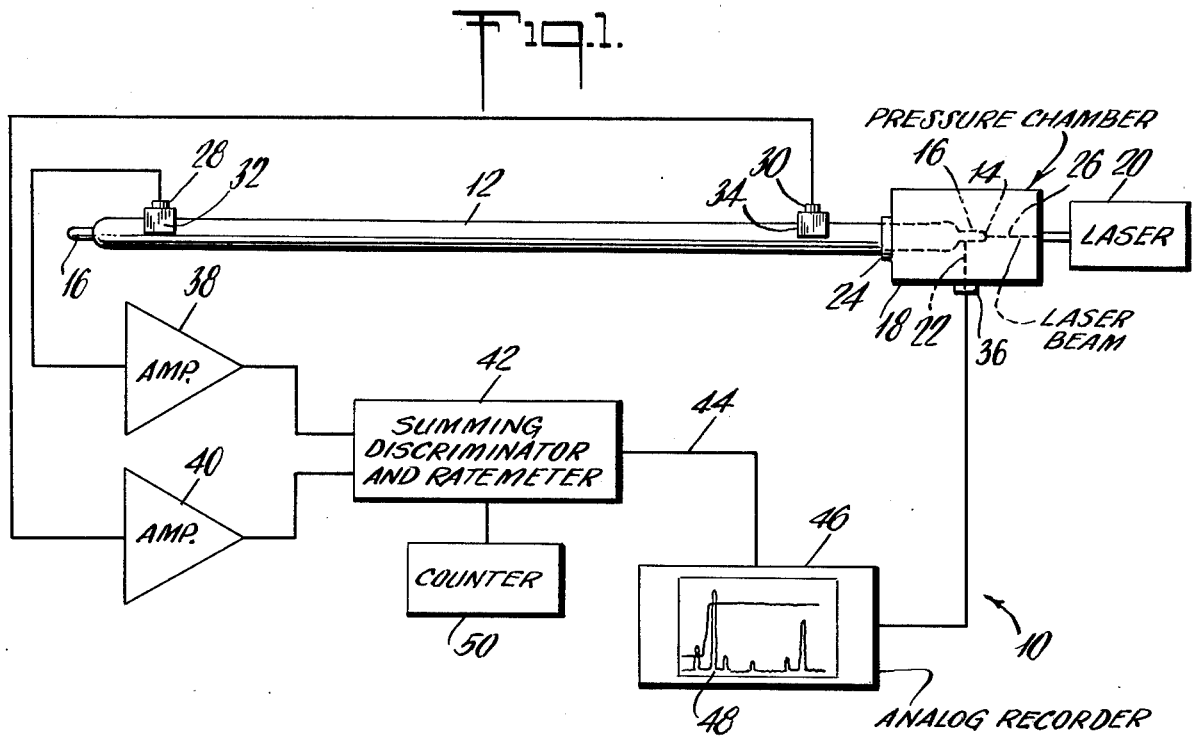
FIG. 1 is a schematic illustration of a system for monitoring pressurization of a nuclear fuel rod.

Referring now to the drawings, there is shown in FIG. 1 a system 10 for verifying pressurization of a fuel rod 12 containing nuclear fuel adapted for use in a nuclear reactor in accordance with the present invention. The present invention relates to and makes use of a method for pressurizing the sealed nuclear fuel rod 12 with an inert gas under pressure by causing a hole 14 to be formed in an end cap 16 of the fuel rod 12 which is located in the pressure chamber 18, preferably when the chamber is under pressure in order that a better weld is provided when the opening is sealed. Preferably, the hole is formed by conventional means such as a laser 30 while the rod is disposed in the chamber as shown. Pressurization is desirable in order to provide structural rigidity for the fuel rod during operation in a nuclear power reactor. The nuclear fuel rod 12 has the standard end caps 16 at either end for sealing the fuel (not shown) within the rod. An end of the rod 12 is located within the chamber 18 such that it is placed at a predetermined location such as by means of an abutment or stop schematically shown at 22, which restricts further inward movement of the rod into the chamber. The entry to the chamber is sealed by means of the seal 24 to prevent communication of the chamber interior with the surrounding atmosphere. The laser 20 is of the conventional type, for example of the pulsed, solid state Nd (neodymium) type laser and is connected to a power source (not shown) for producing a beam of energy 26 which pierces the end cap causing the formation of the hole 14 therein. The function to which this opening is put will be described subsequently in this disclosure in greater detail. A pair of transducers 28 and 30, each of which may comprise a piezoelectric device, are connected to the fuel rod 12 externally of the pressure chamber 18 at spaced apart locations. As shown, one of the transducers 28 is located adjacent the free end of the fuel rod and the other transducer 30 is located between the midpoint on the fuel rod and the end thereof disposed within the pressure chamber. Various other locations of the transducers will suffice for the present invention provided that they are separated by at least 30 inches in order to obtain the best results. These transducers are bonded to machined metal blocks 32, 34 respectively, whose bottom surface has a contour which matches the diameter of the outer surface of the fuel rod. The entire assembly comprising the piezoelectric device and the metal mounting block then is clamped over the fuel pin by means of a machined pit between the fuel rod and mounting block for the purpose of maintaining and detecting broad band noises, that is sonic vibrations occurring within the fuel rod. Any noises which develop or are produced during the pressurization process thus are transmitted through the metal wall of the fuel rod and are sensed by the acoustic transducers 28, 30. Connected to the pressure chamber 18 is a pressure transducer 36 which also comprises a piezoelectric device and is connected to the chamber for monitoring the status of the pressure within the pressurization chamber. As will be apparent from a complete reading of this disclosure, the fact that the fuel rod has been properly pressurized can be verified by observing the traces of resulting acoustic and pressure electric signals from these aforedescribed transducers. The output from each of the acoustic transducers 28, 30 is connected to an amplifier 38 and 40 respectively, which themselves are essentially conventional and in the present invention function to increase the amplitude of the signal from each of the transducers to a usable level which can be processed by electronic circuitry of this invention. Basically, each amplifier is of the high gain band pass type. The output from each amplifier is connected to a conventional summing discriminator and ratemeter 42. The discriminator circuit portion of this unit is operable for only certain signals received from the amplifiers which comprise those exceeding a preset level or amplitude. Any signals exceeding this threshold level are converted to pulses, which then are summed together and processed through the ratemeter circuit. The output from the ratemeter at 44 is in the form of an analog signal representative of the number of times that the input signals from the amplifiers 38 and 40 exceeded the present threshold, that is the number of threshold crossings sensed by the discriminator circuit. The resultant analog output is recorded on the analog recorder 46 which has a strip chart output 48 providing a permanent record of the ratemeter output and therefore, of the acoustical activity that has taken place in the fuel rod during the preceding pressurization of the fuel rod.

The output from the pressure transducer 36 is coupled to the analog recorder 46 for providing an output trace of the status of the pressure during pressurization. The pressure chamber itself is designed to provide a seal around the fuel rod when it is inserted into the chamber and to allow a vacuum or pressure to be applied to the end of the fuel rod during the drilling, pressurizing, and welding processes. As previously described, once the opening is drilled in the end cap of the fuel rod, turbulent gas flow through the drilled opening causes broad band noise signals to be generated. These signals are transmitted through the metal walls of the fuel rod to the acoustic transducers. The counter 50 connected to the ratemeter and discriminator 42 provides a visual indication in the form of a digital output reading of the results of the discriminator circuit, which is indicative of the integrated area under the acoustic trace on the recorder.

Figure 2:
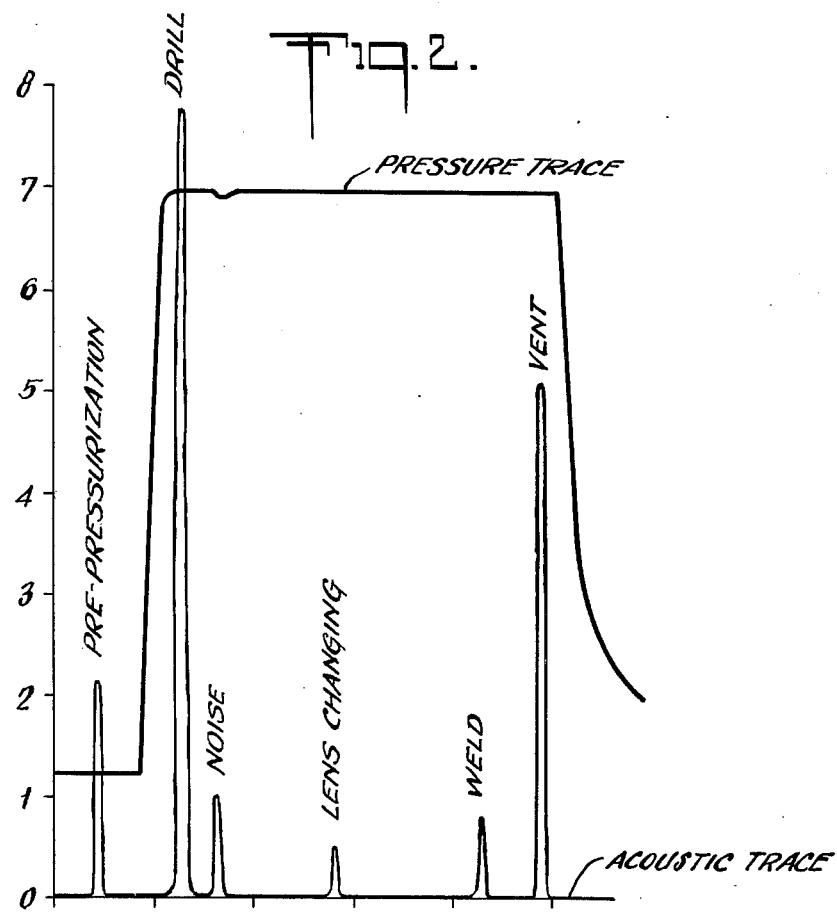
FIG. 2 is an illustration of traces of the recorded signals from the system of FIG. 1.

The operation of the system according to this invention will now be described in greater detail. The fuel rod is inserted into the pressure chamber and the air in the chamber is evacuated by means of a conventional vacuum pump (not shown). After evacuation the chamber is pressurized with an inert gas such as helium, etc. Then the fuel rod is drilled by means of a laser beam such that an opening is formed in the end cap, whereupon gas in the chamber will flow through the drilled opening into the fuel rod. The broad band noises which are generated by the drilling of the opening and the gas rushing through it are transmitted through the metal walls of the rod to the acoustic transducers. These transducers detect this broad band noise and generate an output signal which is proportional to the amplitude of the noise. The amplifiers then amplify the signals from the transducers and provide input signals to the summing discriminator and ratemeter. As explained, the discriminator senses the number of times that the signals cross a predetermined threshold level. An analog signal is shown on the recorder and a digital signal output on the counter (although the latter is optional). The analog signal is recorded on the strip chart recorder as a permanent record of fuel pin pressurization, while the pulse signal also is fed to the counter for visual readout display. A typical pressure trace and acoustic trace are shown in FIG. 2. The acoustic trace comprises a series of spaced spikes each corresponding to a different part of the pressurization process and being of a different level depending upon the amount of noise generated. The pressure trace starts at a constant reference level and rises in a steep slope as the chamber is pressurized. When the chamber reaches the working pressure a constant level is maintained on the pressure curve. The acoustic trace shows that the recorded spike output designated "Pre-pressurization" occurs in advance of the pressurization curve when the pressure first surges into the chamber. As the hole in the end cap of the fuel rod is being drilled, correspondingly broad band noises are sensed in the fuel rod which produces a large value spike signal designated "Drill" in FIG. 2. After the drill signal further noise produced by the entry of the gas from the chamber into the rod is shown by the relatively small spike designated "Noise." A momentary drop in pressure is observed as gas leaves the chamber to enter into the rod. The drop in pressure is small because of the larger volume of the chamber relative to the free volume of the fuel rod. However, because the chamber remains connected to the external gas source, the chamber regains its previous higher pressure. When the lens in the laser is changed for converting from drilling to welding, a noise output is sensed and thus the output is shown for "Lens Changing." After pressurization is completed, which is determined by observation of the constant level pressure output (typically 300–500 psig) the laser welds the opening closed as shown by the relatively low-valued "Weld" spike. Thereafter the pressure chamber is vented, shown by "Venting" spike, and the fuel rod is removed from the chamber. In the illustration of FIG. 2, the units listed 0 through 8 along the vertical are merely general units and have no particular meaning other than to show relative amplitude levels between the various steps occurring during the pressurization of the fuel rod. Verification that the fuel rod has been drilled, that the hole in the end cap has been made, pressurization of the fuel rod, and sealing of the opening, is obtained by observing the corresponding output and comparing them with a signal magnitude which would be expected for the particular part of the process. Thus, for example, if drilling operation failed or was not complete, the absence of a signal with an expected magnitude of about 6 to 8 units would reveal this fact. Once the traces match as described above, it has been determined that the fuel rod is pressurized and the rod then may be removed from the chamber and is ready for use in a fuel bundle to be placed in a nuclear reactor. The next fuel rod which is to be pressurized then is inserted into the chamber and the aforedescribed process is repeated. While the present invention preferably has utility with a fuel pressurization system, wherein the drilling is performed with the pressurization chamber under pressure as compared to prior art practices of drilling under vacuum, in its broader aspects it also has utility with prior art systems used to pressurize fuel rods.

From the foregoing it is apparent that there has been provided an improved system and method for monitoring the pressurization of a fuel rod including monitoring each of the steps associated with such pressurization and verifying when the fuel rod has been pressurized and all steps associated therewith properly completed. Of course, while there has been described a preferred embodiment of the present invention, various modifications which are contemplated within the scope of this invention will become apparent to those skilled in the art upon a reading of this disclosure. Some of these modifications or additions may include calibrating the peak heights of the acoustic traces to relate to the hole diameter drilled by the laser and suitable automation of the equipment such that the next event cannot occur after laser drilling unless a sufficiently high peak height occurs. Accordingly, in order to determine the true scope and spirit of the present invention, reference should be made to the appended claims.

Having thus set forth the nature of the invention, what is claimed herein is:

1. A system for verifying the pressurization of a fuel rod adapted for use in a nuclear reactor comprising, in combination, said fuel rod having one end thereof disposed in a pressure chamber for pressurizing said fuel rod; acoustic transducer means operably attached to said fuel rod for detecting sonic vibrations in said fuel rod; pressure transducer means operably connected to said pressure chamber for sensing the status of pressure in said pressure chamber; and output means connected to said acoustic transducer means and to said pressure transducer means for receiving signals from said acoustic and pressure transducer means respectively, for providing comparison to determine and verify pressurization of said fuel rod.

2. The system of claim 1 wherein said output means provides a visual display of traces of said signals for comparison to determine and verify pressurization of said fuel rod.

3. The system of claim 1 wherein said acoustic transducer means comprises a first and second acoustic transducers connected in spaced relation to said fuel rod.

4. The system of claim 3 wherein said first acoustic transducer is connected to said fuel rod at an end thereof opposite said pressure chamber and said second transducer is connected to said fuel rod between said midpoint of said fuel rod and said pressure chamber.

5. The system of claim 4 wherein said second acoustic transducer is located proximate the midpoint of said fuel rod.

6. The system of claim 1 wherein said acoustic transducer means is connected to amplifier means for increasing the level of the output signals from said transducer means to an operable level.

7. The system of claim 6 including circuit means connected to said amplifier means for integrating the output from said amplifier means and providing a pulse output which is indicative of the pressurization state of said fuel rod.

8. The system of claim 7 including counter means for displaying the output of said transducer means for verifying pressurization of said fuel rod.

9. The system of claim 1 wherein said acoustic transducer means senses the noise produced in said fuel rod caused by the entry of the gas into the rod because of the pressure differential between said fuel rod and said pressure chamber for producing an output signal in accordance with the detected noise.

10. A method for verifying pressurization of a fuel rod element operably disposed at one end thereof in a pressurization chamber and having an opening in said one end, comprising the steps of:
   a. providing a flow of inert gas from said pressurization chamber into said fuel rod;
   b. monitoring the noise produced by the flow of said inert gas into said fuel rod;
   c. monitoring the status of pressure in said pressurization chamber; and
   d. comparing the information obtained from monitoring the noise and pressure in steps (b) and (c) respectively for verifying when pressurization of said fuel rod has been completed.

11. The method of claim 10 including the step of terminating said monitoring of noise and pressure when said pressure of said pressurization chamber is at a substantially constant level.

12. The method of claim 10 including the step of monitoring said noise at two spaced locations on said fuel rod externally of said pressure chamber.

13. The method of claim 10 including the step of converting the outputs sensed by monitoring said noise which exceeds the threshold level into pulse output signals.

14. The method of claim 13 including the step of recording the pulse output signals and the output sensed by monitoring said pressure.

15. The method of claim 14 including the step of comparing the signals produced by the acoustic monitoring and the pressure monitoring and verifying completion of the pressurization of said fuel rod when said signals substantially match predetermined magnitudes.

16. A method for verifying pressurization of a fuel rod element having a sealed end cap at each end thereof with one of said end caps located in a pressurization chamber, comprising the steps of:
   a. evacuating said chamber to remove air present therein;
   b. pressurizing said chamber with an inert gas;
   c. drilling an opening in said end cap when said chamber is pressurized, whereupon the inert gas in said chamber enters said fuel rod for pressurization thereof;
   d. monitoring the pressurization of said fuel rod by providing signals representative of the status of the pressurization of said pressurization chamber and the noise made by the flow of said gas into said fuel rod; and
   E. welding said opening closed when said signals are indicative of the pressurization of said rod.

* * * * *